(12) United States Patent
Sikorski et al.

(10) Patent No.: US 11,097,591 B2
(45) Date of Patent: Aug. 24, 2021

(54) SYSTEM FOR CONTROLLING MOVEMENTS OF DOORS OF A HEATING VENTILATION AND AIR-CONDITIONING MODULE

(71) Applicant: Valeo North America, Inc., Auburn Hills, MI (US)

(72) Inventors: Richard Sikorski, Auburn Hills, MI (US); Darshan Parikh, Auburn Hills, MI (US)

(73) Assignee: Valeo North America, Inc., Auburn Hills, MI (US)

( * ) Notice: Subject to any disclaimer, the term of this patent is extended or adjusted under 35 U.S.C. 154(b) by 76 days.

(21) Appl. No.: 16/398,755

(22) Filed: Apr. 30, 2019

(65) Prior Publication Data

US 2020/0346513 A1  Nov. 5, 2020

(51) Int. Cl.
*B60H 1/00* (2006.01)

(52) U.S. Cl.
CPC ....... *B60H 1/00042* (2013.01); *B60H 1/0005* (2013.01); *B60H 1/00071* (2013.01);
(Continued)

(58) Field of Classification Search
CPC .............. B60H 1/00042; B60H 1/0005; B60H 1/00071; B60H 1/00092; B60H 1/00657;
(Continued)

(56) References Cited

U.S. PATENT DOCUMENTS 4,383,642 A * 5/1983 Sumikawa ......... B60H 1/00678
165/42
4,880,031 A * 11/1989 Fasolino ............ B60H 1/00842
137/625.12

(Continued)

FOREIGN PATENT DOCUMENTS

WO   WO-2016151057 A1 *  9/2016  ......... B60H 1/00857
WO   WO-2018020106 A1 *  2/2018  ......... B60H 1/00857

OTHER PUBLICATIONS

Machine Translation of WO 2016/151057 A1; retrieved Oct. 8, 2020 (Year: 2020).*

*Primary Examiner* — Eric S Ruppert
*Assistant Examiner* — Hans R Weiland
(74) *Attorney, Agent, or Firm* — Osha Bergman Watanabe & Burton LLP (57) ABSTRACT

A system for controlling movements of doors of an HVAC module includes an actuation gear and an intermediate cam. A main door includes a first portion and a second portion having a first guide. The first portion engages with actuation gear to enable linear movement of the main door. A slave door includes a second engagement element and moves between a blocking and unblocking position based on movement of main door. The intermediate cam moves angularly and includes a first engagement element and a second guide. The first engagement element interacts with the first guide, and the second guide interacts with second engagement element to facilitate angular movement of slave door in response to movement of the main door. The first guide includes a bend positioned to enable angular movement of the slave door after the main door moves a pre-determined distance.

14 Claims, 5 Drawing Sheets

(52) U.S. Cl.
CPC ..... *B60H 1/00657* (2013.01); *B60H 1/00678* (2013.01); *B60H 1/00842* (2013.01); *B60H 1/00857* (2013.01); *B60H 2001/00092* (2013.01)

(58) Field of Classification Search
CPC ............ B60H 1/00678; B60H 1/00692; B60H 1/00842; B60H 1/00857; B60H 2001/00707
See application file for complete search history.

(56) References Cited

U.S. PATENT DOCUMENTS

| | | | | |
|---|---|---|---|---|
| 5,687,790 | A * | 11/1997 | Trame | B60H 1/00678 |
| | | | | 165/103 |
| 5,797,585 | A * | 8/1998 | Auvity | B60H 1/00857 |
| | | | | 251/80 |
| 5,950,711 | A * | 9/1999 | Bendell | B60H 1/0005 |
| | | | | 165/126 |
| 6,138,749 | A * | 10/2000 | Kawai | B60H 1/00842 |
| | | | | 165/204 |
| 6,354,169 | B1 * | 3/2002 | Toyoshima | B60H 1/00842 |
| | | | | 177/184 |
| 2001/0008148 | A1 * | 7/2001 | Ito | B60H 1/00857 |
| | | | | 137/625.46 |
| 2003/0045224 | A1 * | 3/2003 | Vincent | B60H 1/00842 |
| | | | | 454/156 |
| 2009/0241574 | A1 * | 10/2009 | Ozeki | B60H 1/00857 |
| | | | | 62/239 |
| 2017/0305233 | A1 | 10/2017 | Spryshak | |
| 2018/0186213 | A1 * | 7/2018 | Torok | B60H 1/00064 |
| 2020/0001679 | A1 * | 1/2020 | Akiyama | B60H 1/00857 |

\* cited by examiner

SYSTEM FOR CONTROLLING MOVEMENTS OF DOORS OF A HEATING VENTILATION AND AIR-CONDITIONING MODULE

FIELD OF THE INVENTION

The present invention relates to a Heating Ventilation and Air-Conditioning (HVAC) module for a vehicle, more particularly, to a system for controlling movements of mixing doors of a Heating Ventilation and Air-Conditioning (HVAC) module.

BACKGROUND OF THE INVENTION

Figures 1A, 1B:
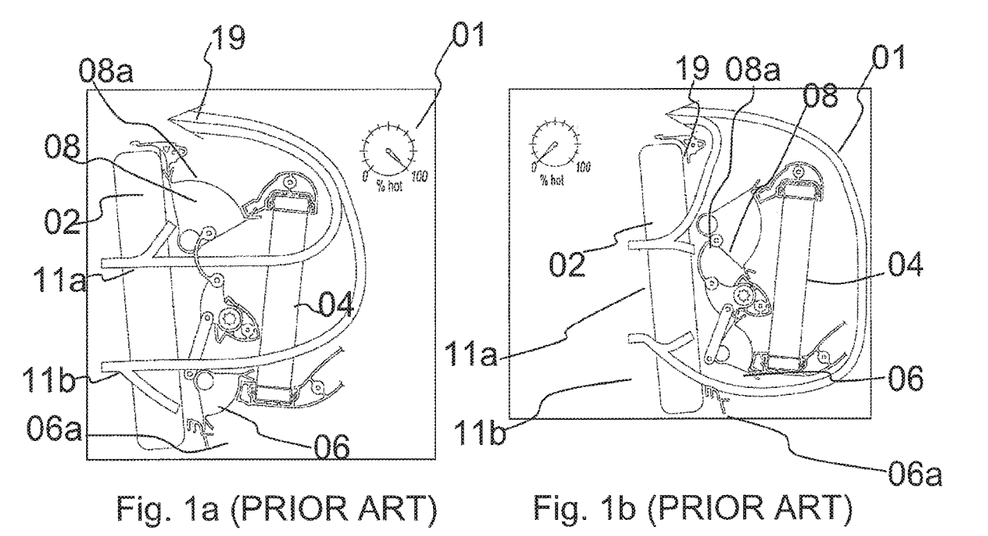
FIG. 1a-FIG. 1c illustrates a conventional Heating Ventilation and Air-Conditioning (HVAC) module configured with conventional mixing doors depicting different positions of the mixing doors.
Figure 1C:
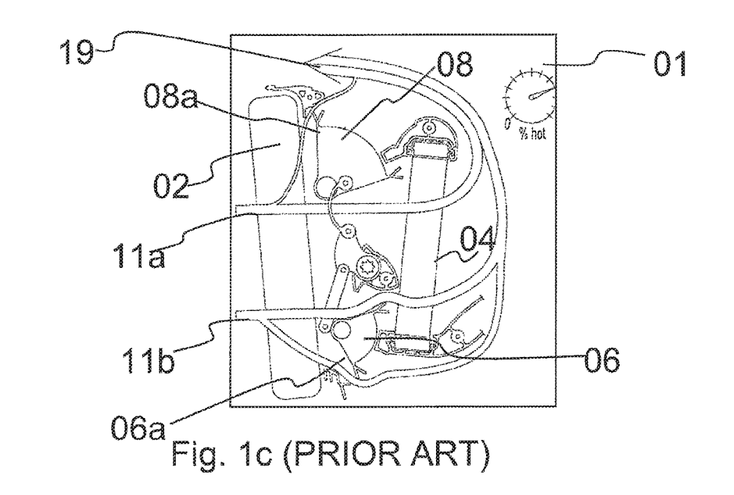

Conventionally, a Heating Ventilation and Air-Conditioning (HVAC) module for a vehicle may include a pair of mixing doors for directing air processed in at least one of the heater core and the evaporator core of the HVAC module to a blending zone where the temperature of the air is adjusted by mixing of different air streams obtained by passing through at least one of heater core and evaporator. Thereafter the temperature adjusted air is directed to the vehicle's cabin. The pair of doors may be operated by a mechanism such that the mixing doors simultaneously open and close based on a temperature set in the HVAC and there is no time delay in either the opening of the mixing doors and/or closing of the mixing doors. Referring to FIGS. 1a-1c of the accompanying drawings, the conventional Heating Ventilation and Air-Conditioning (HVAC) module 01, generally includes housing for receiving a blower, an evaporator 02, a heater core 04 located downstream of the evaporator 02, a first mixing door 06 for blocking and unblocking a first by-pass passage 06a and a second mixing door 08 for blocking and unblocking a second by-pass passage 08a. The evaporator 02 cools the air passing there-through to provide cold air and the heater core 04 heats the air passing there-through. The total airflow flows through the evaporator 02 and splits into an upper airflow stream 11a and a lower airflow stream 11b. Based on the desired cabin temperature, the position of the first mixing door 06 and the second mixing door 08 is changed and depending upon the position of the first mixing door 06 and the second mixing door 08, flow path followed by the upper air flow stream 11a and the lower air flow stream 11b is determined. More specifically, in case the first and second mixing doors 06 and 08 are blocking the first and the second by-pass passage 06a and 08a respectively, the upper and the lower airflow stream 11a and 11b passes through the evaporator 02 and subsequently through the heater core 04 as illustrated in FIG. 1a. The air after passing through the evaporator 02 and the heater core 04 mixes in a blend zone 19 to provide hot air. Similarly, in case the first and the second mixing door 06 and 08 are un-blocking the first and the second by-pass passage 06a and 08a respectively, the upper and the lower airflow stream 11a and 11b passes through the evaporator 02 and bypasses the heater core 04 by flowing through the first and the second by-pass passage 06a and 08a respectively. The air after passing through the evaporator 02 and by-passing the heater core 04 mixes in the blend zone 19 to provide cold air. In case the first mixing door 06 and the second mixing door 08 are partially unblocking the first by-pass passage 06a and the second by-pass passage 08a respectively, a portion of the upper air flow stream 11a and the lower air flow stream 11b sequentially passes through the evaporator 02 and the heater core 04 and the remaining of the upper air flow stream 11a and the lower air flow stream 11b after passing through the evaporator 02 by-passes the heater core 04 and escapes through the first by-pass passage 08a and the second by-pass passage 08b respectively as illustrated in FIG. 1c and all the streams later mixes in the blend zone 19 to provide a mixture of hot and cold air. There are several types of mixing doors currently used for the blend function in the Heating Ventilation and Air-Conditioning (HVAC) module. For example, a flag door has a single leaf that angularly moves about an axis at an edge of the leaf. Alternatively, a butterfly door has two leaves and that angularly moves about a common axis between the two leaves. Further, a barrel door has an outer cylindrical surface that forms of part of an imaginary cylinder and the barrel door angularly moves about an axis passing through the centre of the cylinder. The conventional mixing doors angularly move for configuring blocking and unblocking configuration thereof and as such operation and packaging thereof within limited available space between the heater core 04 and the evaporator 02 is difficult. As such the heater core 04 and the evaporator 02 of the Heating Ventilation and Air-Conditioning module 01 configured with the conventional mixing doors 06 and 08 are required to be sufficiently spaced apart to provide sufficient operating space for operation of the mixing doors, accordingly, the overall size of the Heating Ventilation and Air-Conditioning module 1 is increased. Further, it has been observed and as disclosed in prior art document US 2017/0305233, in case opening ratio of the first and the second mixing doors 06 and 08 is not controlled and the first mixing door 06 and the second mixing door 08 move together, the mixing of the air streams is uncontrolled and the temperature change is non-linear, accordingly, achieving of steady, comfortable temperature inside the cabin becomes difficult using the temperature control knob.

SUMMARY OF THE INVENTION

Accordingly, there is a need for first and second mixing doors for a Heating Ventilation and Air-Conditioning module that requires comparatively less operating space for operation thereof and as such can be packaged within limited space between the heater core and the evaporator. Further, there is a need for a system for controlling movement of the mixing doors that facilitate controlled mixing of air streams for achieving linear temperature change and a steady, comfortable temperature inside the vehicle cabin using a temperature control knob.

An object of the present invention is to provide mixing doors for use in Heating Ventilation and Air-Conditioning module of vehicle that obviates the drawbacks associated with conventional mixing doors for use in Heating Ventilation and Air-Conditioning module of vehicles.

Another object of the present invention is to provide mixing doors for use in Heating Ventilation and Air-Conditioning module of vehicle that require comparatively less operating space for operation thereof and can be packaged within limited space between a heater core and an evaporator of the Heating Ventilation and Air-Conditioning module.

Still another object of the present invention is to provide a system for controlling movement of a first mixing door and a second mixing door, particularly, opening ratios of the mixing doors to facilitate controlled mixing of air streams for achieving linear temperature change and a steady, comfortable temperature inside the vehicle cabin using the temperature control knob.

In the present description, some elements or parameters may be indexed, such as a first element and a second element. In this case, unless stated otherwise, this indexation is only meant to differentiate and name elements which are similar but not identical. No idea of priority should be inferred from such indexation, as these terms may be switched without betraying the invention. Additionally, this indexation does not imply any order in mounting or use of the elements of the invention.

A system for controlling movements of doors of a Heating Ventilation and Air-Conditioning module is disclosed in accordance with an embodiment of the present invention. The system for controlling movement of doors includes an actuation gear, a main door, a slave door and an intermediate cam. The main door includes a first portion and a second portion having a first guide, wherein the first portion engages with the actuation gear to enable linear movement of the main door between a first position and a second position. The slave door includes a second engagement element and angularly moves between a blocking position and an unblocking position based on movement of the main door. The intermediate cam angularly moves and includes a first engagement element and a second guide configured thereon. The intermediate cam couples the main door with the slave door, wherein the first engagement element interacts with the first guide, whereas the second guide interacts with the second engagement element to facilitate angular movement of the slave door in response to movement of the main door. The first guide is configured with a bend so positioned to enable angular movement of the slave door after the main door had moved a pre-determined distance.

Generally, the actuation gear is actuated by a power source that is either one of a motor and an engine.

Specifically, the first portion of the main door is a rack.

Generally, the first engagement element and the second guide are disposed on extreme ends of the intermediate cam.

Specifically, the first portion of the main door blocks a first by-pass passage when the main door is in the first position and unblocks the first by-pass passage when the main door is in the second position.

Similarly, the slave door in the blocking position thereof blocks a second by-pass passage and in the un-blocking position thereof un-blocks the second by-pass passage.

Particularly, the slave door starts to move angularly when the first engagement element had crossed the bend in the first guide.

Generally, the first engagement element and the second engagement element are pins that are received and move within the respective complimentary first guide and the second guide, wherein the first guide and the second guide are slots.

Alternatively, the first engagement element and the second engagement element are rollers that are received and move within the respective complimentary first guide and the second guide, wherein the first guide and the second guide are guide-ways.

A Heating Ventilation and Air-Conditioning (HVAC) module is disclosed in accordance with another embodiment of the present invention. The Heating Ventilation and Air-Conditioning (HVAC) module includes an evaporator and a heater core spaced apart from the heater core and a system for controlling movements of doors of the Heating Ventilation and Air-Conditioning module disposed between the evaporator and the heater core that includes an actuation mechanism, a main door, a slave door and an intermediate cam. The main door includes a first portion and a second portion, wherein the first portion engages with the actuation mechanism to enable linear movement of the main door between a first position and a second position. The slave door angularly moves between a blocking position and an unblocking position based movement of the main door. The intermediate cam interacts with the main door and the slave door to facilitate angular movement of the slave door in response to movement of the main door after the main door had moved a pre-determined distance.

Specifically, the intermediate cam couples the main door and the slave door and includes a first engagement element and a second guide, the first engagement element interacts with a first guide formed on the second portion of the main door, whereas a second guide interacts with a second engagement element formed on the slave door to facilitate angular movement of the slave door in response to movement of the main door.

In accordance with an embodiment of the present invention, the actuation mechanism is a crank connected to the main door and converts rotary movement thereof into linear movement of the main door.

Alternatively, the actuation mechanism is a piston-cylinder arrangement connected to the main door to cause linear movement of the main door.

Further, the Heating Ventilation and Air-Conditioning module includes a housing for receiving the evaporator and the heater core and a blower to configure pressure difference across the evaporator and heater core.

BRIEF DESCRIPTION OF THE DRAWINGS

Other characteristics, details and advantages of the invention can be inferred from the description of the invention hereunder. A more complete appreciation of the invention and many of the attendant advantages thereof will be readily obtained as the same becomes better understood by reference to the following detailed description when considered in connection with the accompanying figures, wherein.

It must be noted that the figures disclose the invention in a detailed enough way to be implemented, said figures helping to better define the invention if needs be. The invention should however not be limited to the embodiment disclosed in the description.

DETAILED DESCRIPTION

Referring to FIGS. 1a-1c of the accompanying drawings, a conventional Heating Ventilation and Air-Conditioning (HVAC) module 01 generally includes housing for receiving a blower, an evaporator 02, a heater core 04 located downstream of the evaporator 02, a first mixing door 06 for blocking and unblocking a first by-pass passage 06a and a second mixing door 08 for blocking and unblocking a second by-pass passage 08a. Each of the conventional mixing doors 06, 08 angularly moves about own axis thereof for configuring blocking and unblocking configuration thereof and as such operation and packaging thereof within limited available space between the heater core 04 and the evaporator 02 is difficult. As such the heater core 04 and the evaporator 02 of the Heating Ventilation and Air-Conditioning module 01 configured with the conventional mixing doors 06 and 08 are required to be sufficiently spaced apart to provide sufficient operating space for the operation of the mixing doors. Accordingly, the overall size of the Heating Ventilation and Air-Conditioning module 01 is increased. Further, it has been observed that in case opening ratio of the first and the second mixing doors 06 and 08 is not controlled and the first mixing door 06 and the second mixing door 08 move together, the mixing of the air streams is uncontrolled and the temperature change is non-linear, accordingly, achieving of steady, comfortable temperature inside the cabin using the temperature control knob becomes difficult.

To overcome the drawback of the conventional mixing doors, the present invention suggests use of at least one sliding type mixing door that slides to define blocking and unblocking configuration of the mixing door instead of rotary type mixing doors that angularly move to define the blocking and unblocking configuration of the doors. The sliding type door requires comparatively less operating space as compared to the rotary type of doors and as such the sliding type mixing door can conveniently operate and be packaged in the limited space between the heater core and the evaporator of the Heating ventilation module. Further in order to overcome the problems arising due to the mixing doors moving together that causes uncontrolled mixing and non-linear temperature change, the present invention also discloses a system for controlling opening ratios of the mixing doors, particularly, delaying opening of a top or slave mixing door with respect to opening of a bottom or main mixing door, wherein at least one of the mixing doors is a sliding type mixing door. By controlling the opening ratio of the mixing doors, linear temperature change and steady, comfortable temperature inside the cabin is achieved using the temperature control knob. Although, the subject specification explains configuration and operation of a Heating Ventilation and Air-Conditioning (HVAC) module that utilizes a system for controlling movement of mixing doors to control opening/closing ratio, while at least one of the mixing doors is of sliding type door that requires comparatively less operating space for operation as compared to conventionally used rotary type of mixing doors. However, present invention is also applicable and can be extended to any application in vehicular or non-vehicular environment, wherein opening ratios of the doors is required to be controlled for any reason and one of the doors is a sliding type of door.

Figure 2:
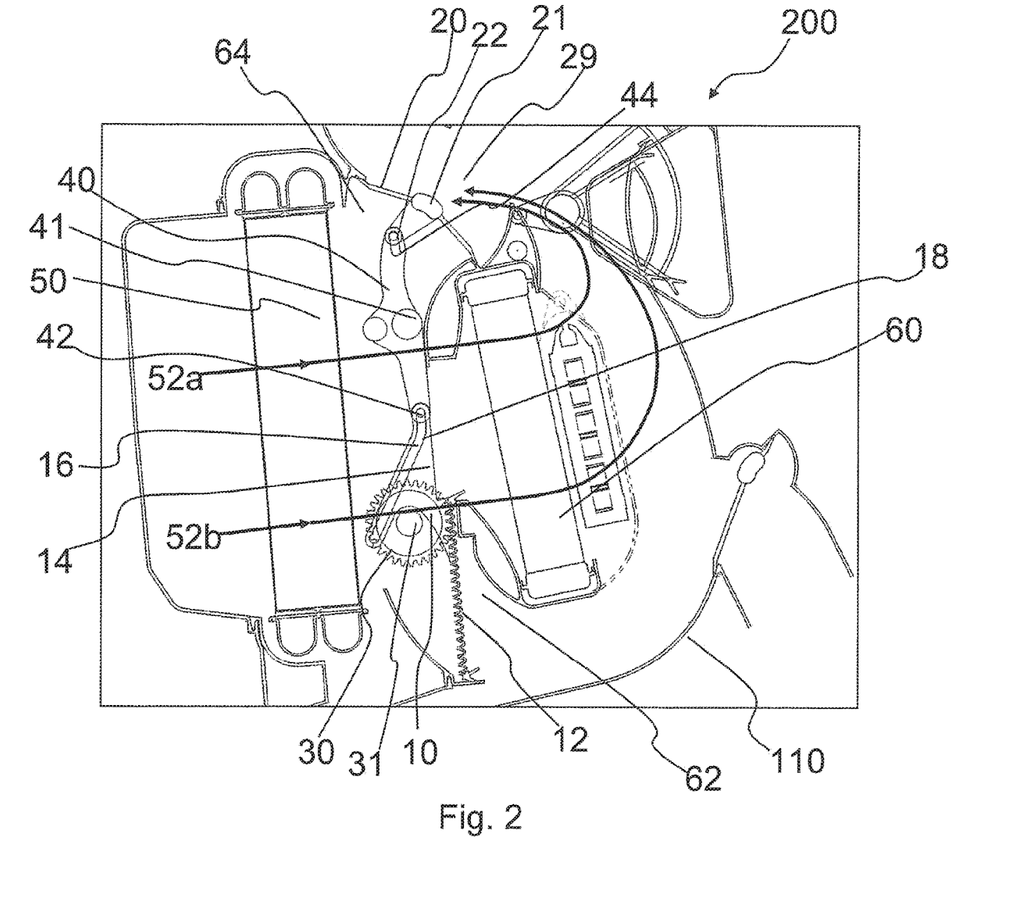
FIG. 2 illustrates a heating Ventilation and Air-Conditioning module with a system for controlling movement, particularly, opening ratio of a first mixing door and a second mixing door of in accordance with an embodiment of the present invention, wherein the first mixing door and the second mixing door are in blocking position.
Figure 3:
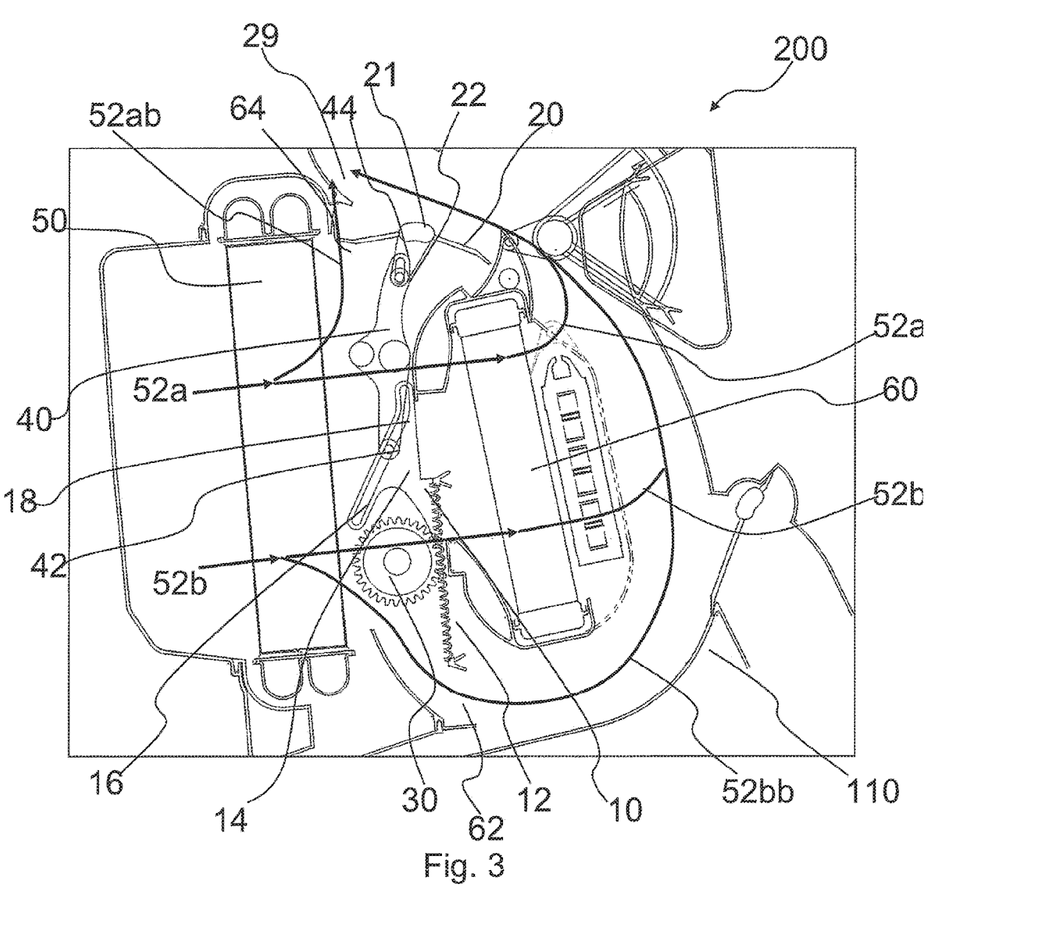
FIG. 3 illustrates the system of the HVAC module of FIG. 2, with the first mixing door and the second mixing door in partially blocking position.
Figure 4:
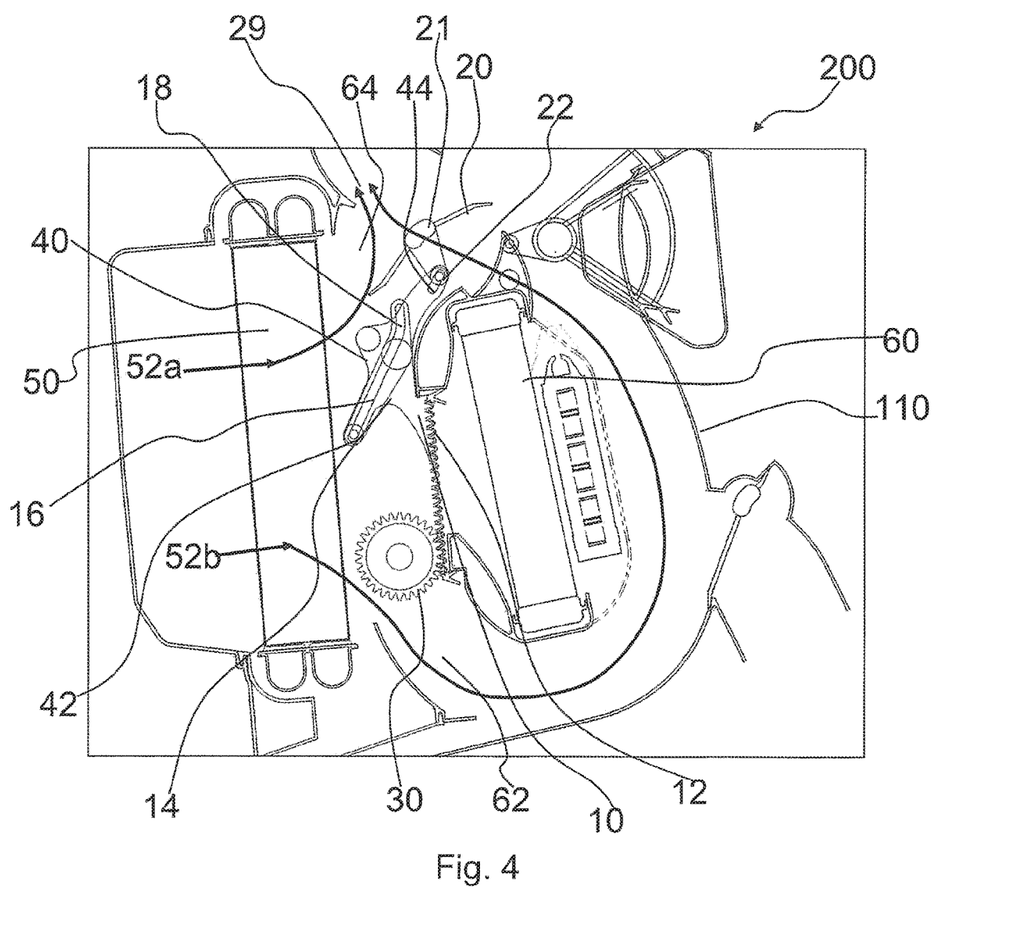
FIG. 4 illustrates the system of the HVAC module of FIG. 2, with the first mixing door and the second mixing door in an un-blocking position.

Referring to FIGS. 2-4 of the accompanying drawings, a Heating Ventilation and Air-Conditioning (HVAC) module 200, hereinafter referred to as HVAC module, generally includes a housing 110 for receiving a blower (not shown in FIGS.), an evaporator 50 and a heater core 60 located downstream of the evaporator 50. These components are typical components for the HVAC module 200 and operate similarly to the components in the conventional HVAC module 1. Thus for the sake of brevity of the present document, the configuration and operation of the blower, the evaporator 50, and the heater core 60 will not be explained in further detail. The HVAC module 200 further includes a first mixing door 10, also referred to as a main door 10 or a bottom mixing door 10 for blocking and unblocking a first by-pass passage 62 and a second mixing door 20, also referred to as a slave door 20 or a top mixing door 20 for blocking and unblocking a second by-pass passage 64. At least one door of the main door 10 and the slave door 20 is a sliding type door. In accordance with an embodiment of the present invention as illustrated in FIG. 2-FIG. 4, the main door 10 is a sliding type mixing door, whereas the slave door 20 is a rotary type mixing door. However, instead of the main door 10 being the sliding type door, the slave door 20 can be the sliding type door. The sliding type door slides axially to define blocking and unblocking configuration of the mixing door instead of rotary type mixing door that angularly moves about a rotary axis thereof to define the blocking and unblocking configuration of the door. Accordingly, the sliding type doors require comparatively less operating space as compared to the rotary type of doors and as such the sliding type mixing door can conveniently operate and be packaged in the limited space between the heater core 60 and the evaporator 50 of the HVAC module 200.

The evaporator 50 cools the air passing there-through to provide cold air and the heater core 60 heats the air passing there-through. The total airflow flows through the evaporator 50 and splits into an upper airflow stream 52a and a lower airflow stream 52b. Based on the desired cabin temperature or the temperature selections made, the position of the main door 10 and the slave door 20 is changed based on temperature settings inside the vehicle cabin selected by the vehicle occupant and depending upon the position of the main door 10 and the slave door 20, flow path followed by the upper air flow stream 52a and the lower air flow stream 52b is determined. More specifically, in case the main door 10 and the slave door 20 are blocking the first by-pass passage 62 and the second by-pass passage 64 respectively, the upper airflow stream 52a and the lower airflow stream 52b passes through the evaporator 50 and subsequently through the heater core 60 as illustrated in FIG. 2 and later mixes in a blend zone 29 to provide hot air.

In case the main door 10 and the slave door 20 are partially unblocking the first by-pass passage 62 and the second by-pass passage 64 respectively, a portion of the upper air flow stream 52a along with a portion of the lower air flow stream 52b sequentially passes through the evaporator 50 and the heater core 60. The remaining portion 52ab of the upper air flow stream 52a and the remaining portion 52bb of the lower air flow stream 52b after passing through the evaporator 50 by-passes the heater core 60 and escapes through the partially unblocked second by-pass passage 64 and the first by-pass passage 62 respectively as illustrated in FIG. 3 and all the streams later mixes in the blend zone 29 to provide a mixture of hot and cold air.

In case the main door 10 and the slave door 20 are un-blocking the first by-pass passage 62 and the second by-pass passage 64 respectively, the upper airflow stream 52a and the lower airflow stream 52b pass through the evaporator 50 and bypass the heater core 60 by flowing through the first by-pass passage 62 and the second by-pass passage 64 respectively as illustrated in FIG. 4 and later mixes in the blend zone 29 to provide cold air.

Figure 5:
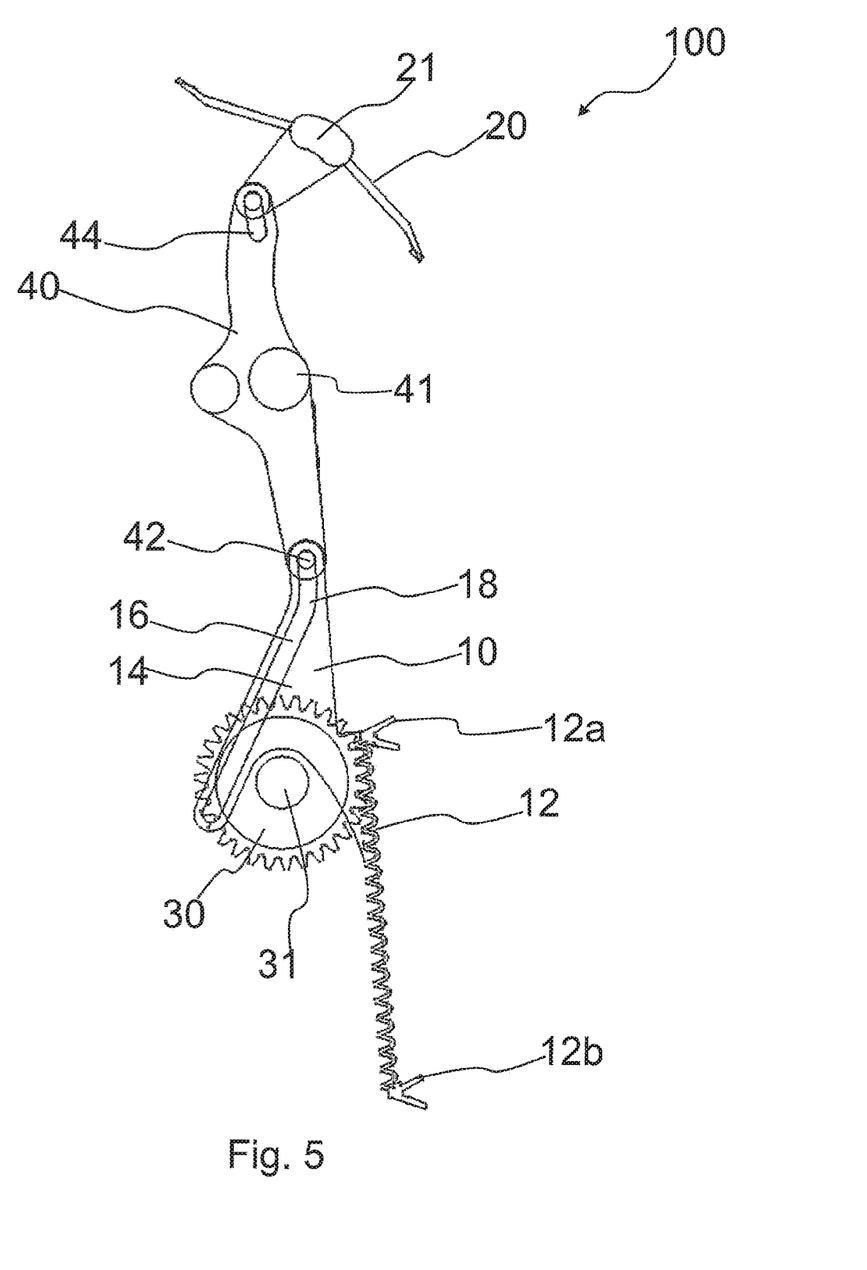
FIG. 5 illustrates the system for controlling opening ratio of the first mixing door and the second mixing door of the HVAC module of FIG. 2.

Also is disclosed a system 100 for controlling opening ratios of the main door 10 and the slave door 20 in accordance with an embodiment of the present invention. FIG. 5 illustrates the system 100 for controlling opening ratio of the main door 10 and the slave door 20 of the HVAC module 200. The main door 10 and the slave door 20 are so coupled by the intermediate door 40 that the slave door 20 is closing if the main door 10 is closing and the slave door 20 is opening if the main door 10 is opening. The slave door 20 starts opening when the main door 10 has already opened partially and the slave door 20 fully opens when the main door 10 is fully open. Particularly, the system 100 delays opening of the slave door 20 with respect to opening of the main door 10. Further, the slave door 20 is closed while the main door 10 is still closing, i.e. and there is delay in the closing of the main door 10 with respect to the closing of the slave door 20, wherein at least one of the mixing doors, particularly, the main door 10 is sliding type door. By controlling the opening ratio of the main door 10 and the slave door 20 in such a way, there is controlled mixing between the various air streams that in turn results in linear temperature change and achieving of steady, comfortable temperature inside the cabin using a temperature control knob.

The system 100 for controlling movement of the main door 10 and the slave door 20 includes an actuation mechanism that interacts with the main door 10 and an intermediate cam 40 that interacts with the main door 10 and the slave door 20.

The main door 10 includes a first portion 12 and a second portion 14 having a first guide 16, wherein the first portion 14 engages with the actuation mechanism to enable linear movement of the main door 10 between a first position and a second position. The first portion 12 includes stopper elements 12a, 12b configured thereon, preferably on end portions thereof that interact with projections configured on the inside walls of the housing 110 to define the first and second position of the main door 10. In the first position, the main door 10 blocks the first bypass passage 62 as illustrated in FIG. 2. In the second position the main door 10 un-blocks the first bypass passage 62 as illustrated in FIG. 4. In an intermediate position of the main door 10 as illustrated in FIG. 3, the main door 10 is in a position between the blocking position, as depicted in FIG. 2, and an unblocking position, as depicted in FIG. 4, to cause partially opening of the main door 10 to partially un-block of the first bypass passage 62 and allow limited flow through the first bypass passage 62. In accordance with an embodiment of the present invention, the actuation mechanism is an actuation gear 30. The actuation gear 30 is actuated by a power source that is either one of a motor and an engine. Particularly, the actuation gear 30 meshes with the first portion 12 of the main door 10 that is in form of a rack to cause linear movement of the main door 10. The main door 10 is coupled to and disposed between the actuation gear 30 and the intermediate cam 40. The actuation gear 30 is mounted on a first mounting element 31 configured and appropriately placed inside the housing 110 whereas the intermediate cam 40 is mounted on a second mounting element 41 configured and appropriately placed inside the housing 110. In accordance with an embodiment of the present invention, the actuation mechanism is a crank that rotates and is connected to the main door 10 to convert angular movement thereof into linear movement of the main door 10. In accordance with still another embodiment of the present invention, the actuation mechanism is a piston-cylinder arrangement that is connected to the main door 10 to cause linear movement of the main door 10. However, the present invention is not limited to any particular configuration of the actuation mechanism, until the actuation mechanism causes linear movement of the main door 10. The actuation mechanism is so configured and the interaction between the actuation mechanism and the first portion 12 of the main door 10 is such that the main door moves linearly in first direction to unblock the first by-pass passage 62 and subsequently moves linearly in direction opposite to the first direction to block the first by-pass passage 62. More specifically, in case the actuation mechanism is in the form of the actuation gear 30, the actuation gear 30 rotates in an anti-clockwise direction to cause the main door 10 to move linearly in the first direction to unblock the first by-pass passage 62 and subsequently the actuation gear 30 rotates in a clockwise direction to cause the main door 10 to move linearly in the direction opposite to the first direction to block the first by-pass passage 62.

The slave door 20 includes a second engagement element 22 and angularly moves between a blocking position and an unblocking position based on movement of the main door 10. In the blocking position the slave door 20 blocks the second bypass passage 64 as illustrated in FIG. 2. In the unblocking position the slave door 20 un-blocks the second bypass passage 64 as illustrated in FIG. 4. In an intermediate position of the slave door 20 as illustrated in FIG. 3, the slave door 20 is in a position between the blocking position, as depicted in FIG. 2 and an unblocking position, as depicted in FIG. 4, to cause partially opening of the slave door 20 to partially un-block of the second bypass passage 64 and allow limited flow through the second bypass passage 64.

The intermediate cam 40 includes a first engagement element 42 and a second guide 44 configured thereon. Specifically, the first engagement element 42 and the second guide 44 are disposed on extreme ends of the intermediate cam 40. The intermediate cam 40 is coupled to and disposed between the main door 10 and the slave door 20. The intermediate cam 40 is mounted on the second mounting element 41 configured and appropriately placed inside the housing 110, whereas the slave door 20 is mounted on a third mounting element 21 configured and appropriately placed inside the housing 110. The intermediate cam 40 and the slave door 20 are so mounted that the intermediate cam 40 interacts with the main door 10 and the slave door 20 and angularly moves about an axis to facilitate angular movement of the slave door 20 in response to movement of the main door 10. Particularly, the intermediate cam 40 couples the main door 10 with the slave door 20, wherein the first engagement element 42 interacts with the complimentary first guide 16, whereas the second guide 44 interacts with the second engagement element 22 to facilitate angular movement of the slave door 20 in response to movement of the main door 10. Typically, the first engagement element 42 and the second engagement element 22 are pins that are received and move within the respective complimentary first guide 16 and the second guide 44 that are slots. More specifically, at least a portion of the intermediate cam 40 overlaps with at least a portion of the main door 10 and the first engagement element 42 is received inside the complimentary first guide 16. Similarly, at least another portion of the intermediate cam 40 overlaps with at least a portion of the slave door 20 and the second engagement element 22 is received in the second guide 44. With such configuration, the intermediate cam 40 configures a coupling between the main door 10 and the slave door 20. Alternatively, at least one of the first engagement element 42 and the second engagement element 22 are rollers that are received and move within the respective complimentary first guide 16 and the second guide 44 that are guide-ways. However, the present invention is not limited to any particular configuration of the first engagement element 42 and the corresponding complimentary first guide 16, the second engagement element 22 and the corresponding complimentary the second guide 44, until the first engagement element 42 is capable of being received and move within and the corresponding complimentary first guide 16 and the second engagement element 22 is capable of being received and move within the corresponding complimentary the second guide 44 to facilitate angular movement of the slave door 20 in response to movement of the main door 10.

The first guide 16 is configured with a bend 18 so positioned along the first guide 16 to enable angular movement of the slave door 20 after the main door 10 had moved a pre-determined distance. Particularly, the slave door 20 starts rotating when the first engagement element 42 moving along the first guide 16 had crossed the bend 18, i.e. there is a delay in the opening of the slave door 20 with respect to the opening of the main door 20. In an embodiment of the present invention, the pre-determined distance by which the main door 10 moves before the slave door 20 starts moving is equal to the distance of the bend 18 from an extreme end of the first guide 16. Also, with such configuration of the bend 18 disposed along the first guide 16, the main door 10 is still not completely closed when the slave door 20 has just closed, i.e. there is a delay in the closing of the main door 10 with respect to the closing of the slave door 20. The delay in the opening of the slave door 20 with respect to the main door 10 and delay in the closing of the main door 10 with respect to closing of the slave door 20 can be defined by defining the position of the bend 18 along the first guide 16. With such delay in the opening of the slave door 20 with respect to the main door 10 and delay in closing of the main door 10 with respect to closing of the slave door 20, there is controlled mixing between the various air streams that in turn results in linear temperature change and achieving of steady, comfortable temperature inside the cabin using the temperature control knob.

Several modifications and improvement might be applied by the person skilled in the art to the system for controlling movements of doors of a Heating Ventilation and Air-Conditioning module as disclosed above and such modifications and improvements will still be considered within the scope and ambit of the present invention, as long as the system includes an actuation gear, a main door, a slave door and an intermediate cam. The main door includes a first portion and a second portion having a first guide, wherein the first portion engages with the actuation gear to enable linear movement of the main door between a first position and a second position. The slave door includes a second engagement element and angularly moves between a blocking position and an unblocking position based on movement of the main door. The intermediate cam angularly moves and includes a first engagement element and a second guide configured thereon. The intermediate cam couples the main door and the slave door, wherein the first engagement element interacts with the first guide, whereas the second guide interacts with the second engagement element to facilitate angular movement of the slave door in response to movement of the main door. The first guide is configured with a bend so positioned to enable angular movement of the slave door after the main door had moved a pre-determined distance.

In any case, the invention cannot and should not be limited to the embodiments specifically described in this document, as other embodiments might exist. The invention shall spread to any equivalent means and any technically operating combination of means.

What is claimed is:

1. A system for controlling movements of doors of a heating, ventilation and air-conditioning module, the system comprising:
   an actuation gear;
   a main door comprising a first portion and a second portion having a first guide, wherein the first portion is configured to engage with the actuation gear to enable linear movement of the main door between a first position and a second position;
   a slave door comprising a second engagement element and configured to angularly move between a blocking position and an unblocking position based on movement of the main door; and
   an intermediate cam configured to angularly move, comprising a first engagement element and a second guide configured thereon, the intermediate cam being directly connected to the main door and the slave door,
   wherein the first engagement element is configured to interact with the first guide, and the second guide is configured to interact with the second engagement element to facilitate angular movement of the slave door in response to movement of the main door,
   wherein the first guide is configured with a bend so positioned to enable angular movement of the slave door after the main door has moved a pre-determined, non-zero, distance.

2. The system as claimed in claim 1, wherein the actuation gear is configured to be actuated by a power source comprising one selected from a group consisting of: a motor and an engine.

3. The system as claimed in claim 1, wherein the first portion of the main door is a rack.

4. The system as claimed in claim 1, wherein the first engagement element and the second guide are disposed on extreme ends of the intermediate cam.

5. The system as claimed in claim 1, wherein the first portion of the main door is adapted to block a first by-pass passage when the main door is in the first position and unblock the first by-pass passage when the main door is in the second position.

6. The system as claimed in claim 1, wherein the slave door in the blocking position thereof is configured to block a second by-pass passage and in the un-blocking position thereof is configured to un-block the second by-pass passage.

7. The system as claimed in claim 1, wherein the slave door is configured to start to move angularly when the first engagement element crosses the bend in the first guide.

8. The system as claimed in claim 1, wherein the first engagement element and the second engagement element are pins that are configured to be received and move within the respective complimentary first guide and the second guide, and wherein the first guide and the second guide are slots.

9. The system as claimed in claim 1, wherein the first engagement element and the second engagement element are rollers that are configured to be received and move within the respective complimentary first guide and the second guide, and wherein the first guide and the second guide are guide-ways.

10. A heating, ventilation and air-conditioning (HVAC) module comprising:
　　an evaporator and a heater core spaced apart from the evaporator; and
　　a system for controlling movements of doors of the HVAC module disposed between the evaporator and the heater core, the system comprising:
　　an actuation mechanism,
　　a main door comprising a first portion and a second portion, wherein the first portion is configured to engage with the actuation mechanism to enable linear movement of the main door between a first position and a second position,
　　a slave door is configured to angularly move between a blocking position and an unblocking position based movement of the main door,
　　an intermediate cam directly connected to the main door and the slave door and configured to facilitate angular movement of the slave door in response to movement of the main door after the main door had moved a pre-determined, non-zero, distance.

11. The HVAC module as claimed in claim 10, wherein the intermediate cam is configured to couple the main door and the slave door, the intermediate cam comprising:
　　a first engagement element adapted to interact with a first guide formed on second portion of the main door, and
　　a second guide configured to interact with a second engagement element formed on the slave door,
　　to facilitate angular movement of the slave door in response to movement of the main door.

12. The HVAC module as claimed in claim 10, wherein the actuation mechanism is a crank configured to rotate and be connected to the main door to convert rotary movement thereof into linear movement of the main door.

13. The HVAC module as claimed in claim 10, wherein the actuation mechanism is a piston-cylinder arrangement configured to be connected to the main door to cause linear movement of the main door.

14. The HVAC module as claimed in claim 10, further comprising: a housing for receiving the evaporator and heater core and a blower adapted to passively configure a pressure difference across the evaporator and heater core.

\* \* \* \* \*